Sept. 25, 1962
R. N. ROLEY
3,055,487
TROUGHING IDLER ASSEMBLY FOR FLEXIBLE STRAND CONVEYOR
Filed Sept. 14, 1959
3 Sheets-Sheet 1
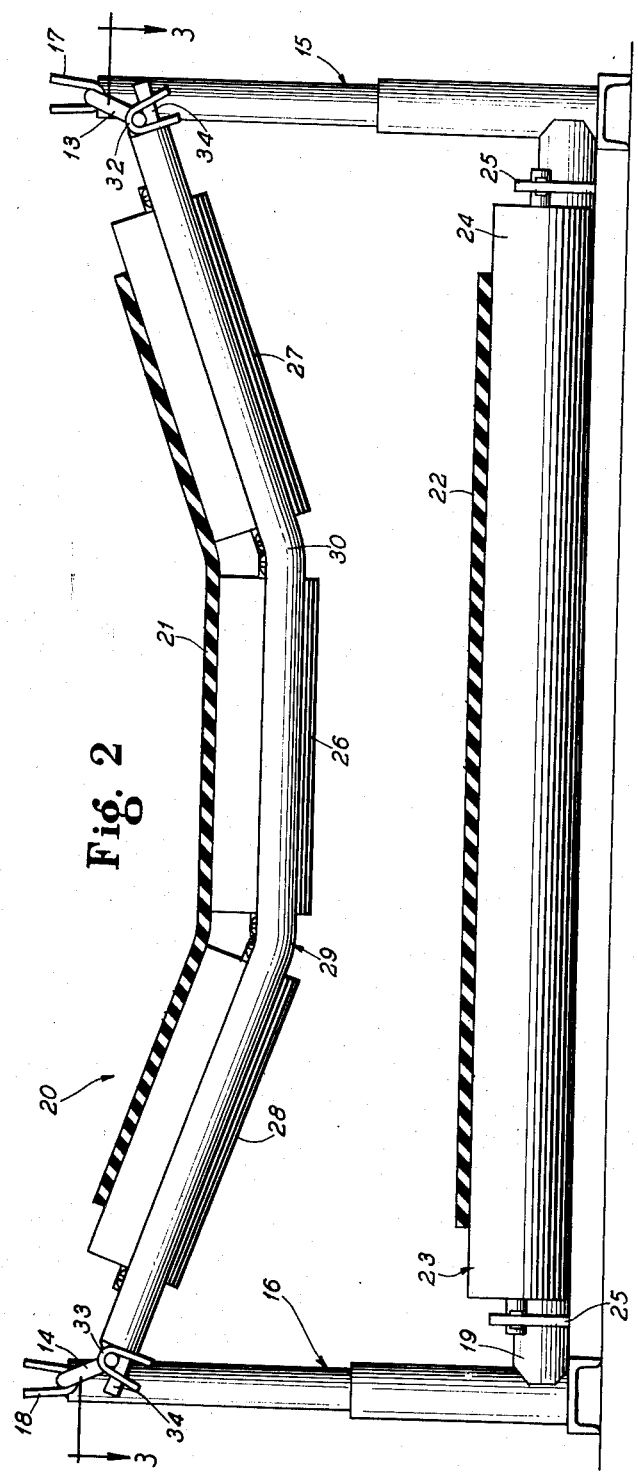
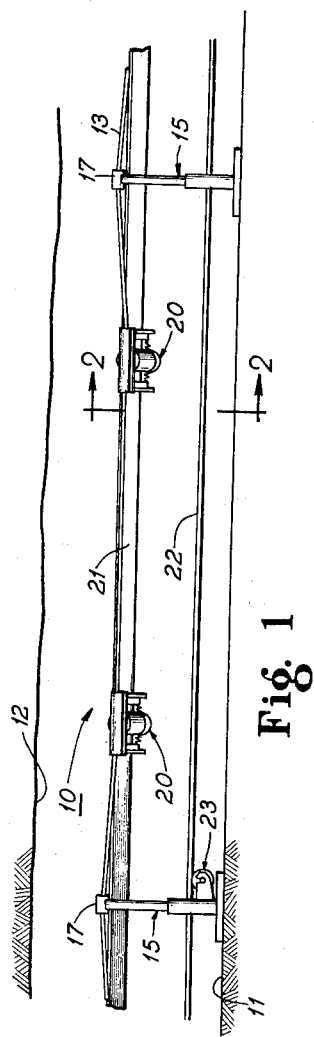
INVENTOR.
Robert N. Roley
BY Sept. 25, 1962 R. N. ROLEY 3,055,487
TROUGHING IDLER ASSEMBLY FOR FLEXIBLE STRAND CONVEYOR
Filed Sept. 14, 1959 3 Sheets-Sheet 2

INVENTOR.
Robert N. Roley
BY

Sept. 25, 1962 R. N. ROLEY 3,055,487
TROUGHING IDLER ASSEMBLY FOR FLEXIBLE STRAND CONVEYOR
Filed Sept. 14, 1959 3 Sheets-Sheet 3

INVENTOR.
Robert N. Roley
BY

United States Patent Office 3,055,487
Patented Sept. 25, 1962

3,055,487
TROUGHING IDLER ASSEMBLY FOR FLEXIBLE STRAND CONVEYOR
Robert N. Roley, Alexandria, Va., assignor to Goodman Manufacturing Company, Chicago, Ill., a corporation of Illinois
Filed Sept. 14, 1959, Ser. No. 839,825
2 Claims. (Cl. 198—192)

This invention relates generally to flexible strand conveyors and particularly to a troughing idler assembly for such conveyors.

Flexible strand conveyors of the type illustrated in Craggs et al. Patent No. 2,773,257 are coming into increasingly widespread use due to their many inherent and desirable features. Among these are a low initial cost, high carrying capacity, great adaptability to varying situations, and ease of installation and replacement.

These conveyors generally comprise a pair of flexible strands, such as wire ropes, which are trained along a conveying course such as a mine drift or the like. The strands are supported at intervals in generally parallel relationship by suitable supporting structure such as ground support stands or overhead hanger assemblies. In the Craggs et al. patent, the supporting structure takes the form of a plurality of support stands, each having a strand seat at its top which receives the flexible strands.

A plurality of troughing idler assemblies are suspended from the support strands at spaced intervals. These idler assemblies include a plurality of generally axially aligned rollers which form a continuous bed for the conveying reach of a flexible conveyor belt. The return reach of the belt is usually supported directly beneath the conveying reach by a plurality of return roller assemblies. The return roller assemblies may be suspended from the support stands or other suitable structure.

A great many troughing idler assemblies have been developed to meet specific needs in specific industries. Many have overlapping features but for purposes of discussion, they may conveniently be classified as flexible or cradled idler assemblies.

A fully flexible idler assembly is illustrated in the Craggs et al. patent. It consists of a plurality of rollers connected at their abutting ends for flexure with respect to one another in a vertical plane. The outer ends of the flanking rollers are then connected directly to the strands. This type of structure is of optimum simplicity and has a high carrying capacity.

A good example of the cradled idler assembly is illustrated in the McCallum Patent No. 2,851,151. The rollers in this construction are carried in a frame structure which in turn is connected directly to the flexible strands. The frame structure may include members spanning all or a portion of the conveyor and may be rigid, as in the McCallum patent, or semi-rigid. The individual rollers are generally restrained from flexure vertically with respect to one another which results in a lessening of its inherent carrying capacity. This feature however is often more than compensated for by the fact that since the troughing contour is maintained relatively uniform, the bodily downward displacement of the entire assembly is less than that of an equally loaded fully flexible idler assembly. This attribute is of particular advantage in low clearance installations such as coal mines where height is always a problem. In effect, the cradled idler assembly places the entire load vertically on the flexible strands thereby minimizing inward deflection of the strands and downward sag of the rollers due to relative inwardly movement of the ends of the roller assembly.

It is possible to mount the fully flexible sausage roller assembly of the Craggs et al. patent in the cradle frame of the McCallum patent, but the optimum features of each structure are not invariably realized. The fully flexible idler assembly has the advantage of being able to trough, or curl around the load, but this advantage is largely lost if the ends of the roller assembly are fixed to the frame assembly. For example, when an off-center load approaches a fully flexible roller assembly connected to a rigid frame, the assembly is likely to assume a L-shaped configuration in which the tip of the crotch marks the point of maximum weight concentration.

As a consequence, the optimum stable carrying capacity of the belt is not realized. Coal, or other bulk materials, near the teetering point is apt to fall off, whereas it would settle towards the center if the roller assembly approached a more regular U-shape.

Accordingly, the primary object of this invention is to provide a cradled troughing idler assembly in which the individual rollers shift vertically independently of one another to thereby attain the optimum troughing contour.

Another object is to provide a troughing idler assembly which provides a better belt troughing contour for off-center loads.

A further object is to provide a troughing idler assembly which increases the carrying capacity of the conveyor by preventing conveyed materials at the teetering point from falling off.

Yet another object is to provide a troughing idler assembly in which individually mounted troughing idler rollers are canted in the direction of belt travel to impart a training effect to the belt.

Yet a further object is to provide a troughing idler assembly support structure for a plurality of individual belt supporting rollers.

Other objects and advantages will become apparent from the following description taken in connection with the accompanying drawings wherein by way of illustration and example certain embodiments of the invention are set forth.

The invention is illustrated more or less diagrammatically in the accompanying drawings wherein:

FIGURE 1 is a side view of a portion of a flexible strand conveyor embodying a troughing idler assembly of the present invention;

FIGURE 2 is a view taken substantially along the line 2—2 of FIGURE 1;

Like reference numerals will be used to refer to like parts throughout the following specification and drawings.

Figure 3:
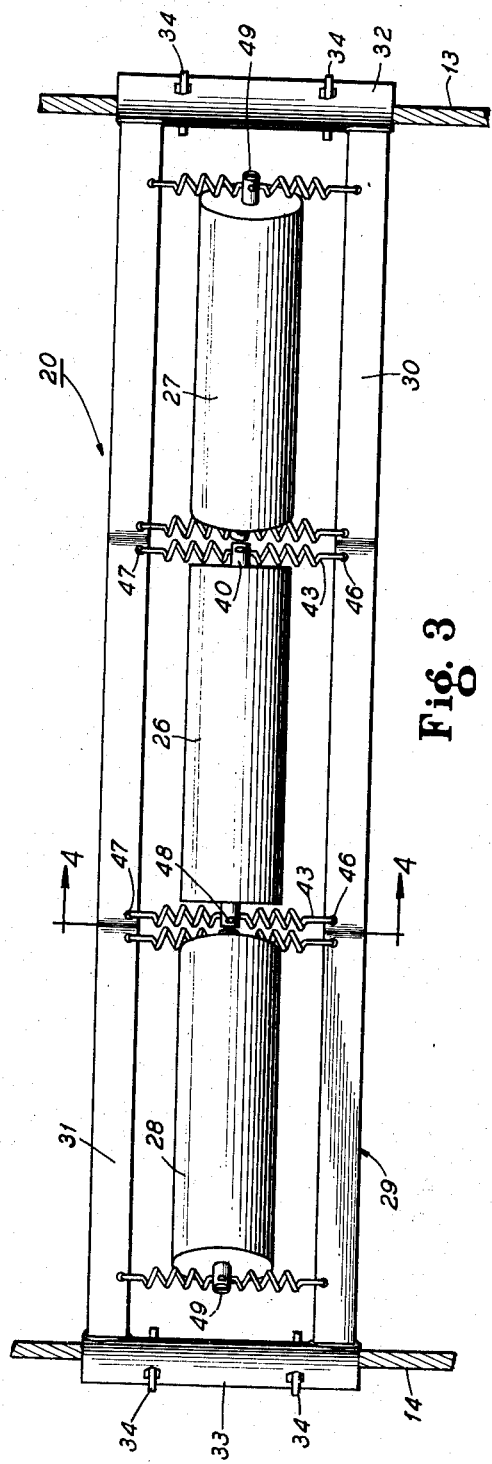
FIGURE 3 is a top plan view taken substantially along the line 3—3 of FIGURE 2.

In FIGURES 1 and 2, a portion of a flexible strand conveyor 10 is shown as resting on ground 11. The conveyor is shown installed in a low vein coal mine whose roof is indicated generally at 12. The conveyor consists essentially of a pair of flexible strands 13 and 14 supported at spaced locations by vertically adjustable support stands having upstanding telescoping portions 15 and 16. The strands are seated in U-shaped saddle members 17 and 18 welded to the top of the telescoping portions of the stands. A strut or cross brace 19 maintains the upstanding portions of the stands a fixed distance apart to thereby provide uniform gauge to the flexible strands at least at their points of securement to the stands.

A plurality of troughing idler assemblies 20 form a bed for the conveying reach 21 of a flexible conveyor belt. The return reach 22 of the belt is supported by return roller assemblies 23 which include an elongated return roller 24 supported by end plates 25 fixed to the support stands. The return roller assemblies are spaced at greater intervals along the conveyor course than the troughing idler assemblies since they support only the weight of the belt.

A troughing idler assembly is illustrated in detail in FIGURES 2 and 3. The assembly includes a plurality of carrying rollers comprising a center, primary load carrying roller 26 flanged by a pair of end or wing rollers 27 and 28.

An elongated frame assembly, indicated generally at 29, supports the rollers independently of one another. The frame assembly includes a pair of elongated side frame members 30 and 31 which are slightly concave upwardly to provide a troughing contour of a relatively shallow angle. The side frame members are transversely oriented with respect to the direction of belt travel and their end portions are welded to inverted U-shaped end frame connector members 32, 33. Flexible strands 13 and 14 are received in the seats formed in the end connectors, and wedges 34 force the strands into snug engagement with the seats. Side members 30, 31, in this instance, are shown as L-channels, as seen best in FIGURE 4, but they may be formed of any convenient structural shape such as tubes, I-beams, rods or the like.

Figure 4:
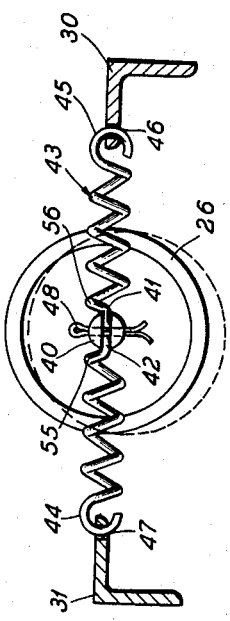
FIGURE 4 is a detail view with parts omitted taken substantially along the line 4—4 of FIGURE 3 illustrating one mode of connecting the individual rollers to the supporting frame assembly.

The individual rollers are supported for movement independently of one another by yieldable end supports shown best in FIGURES 3 and 4. The roller supporting structure in the embodiment illustrated in FIGURES 2 through 4 is substantially identical for each roller, and a description of one will suffice for a description of the others.

The end portions of center roller supporting shaft 40 are bifurcated as at 41 to receive a short, generally horizontally oriented portion 42 of a coil spring 43. The spring 43 terminates in hooks 44, 45 received in apertures 46, 47 drilled in the upper flange of side frame members 30, 31. A cotter pin 48 prevents the spring from slipping out of the slot formed in the bifurcated end portions of each shaft. The roller shafts are so dimensioned that ample clearance is provided between the abutting shaft ends in all relative positions of the rollers.

Figure 6:
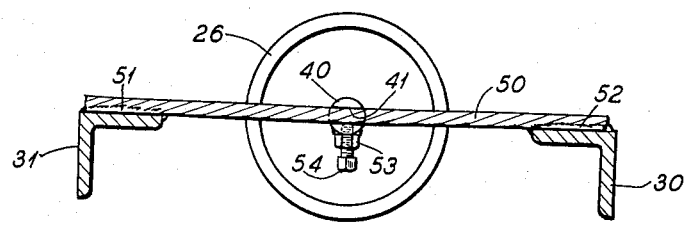
FIGURE 6 is a view similar to FIGURE 4 illustrating another arrangement for connecting the individual rollers to the supporting frame assembly.

Referring now to FIGURE 6, a variation of the invention is illustrated in which a short length of flexible strand 50 has replaced the coil spring 43 of FIGURE 4. The strand is welded as at 51, 52, to the upper flange of L-channels 30, 31.

A projection 53 has been welded to one of the legs forming the bifurcated slot 41 in the end of center roller shaft 40 to provide a substantial travel for tightening bolt 54. Roller 26 is maintained in place on the strand by bolt 54 which passes through projection 53 and one leg of the bifurcated shaft 40.

Figure 5:
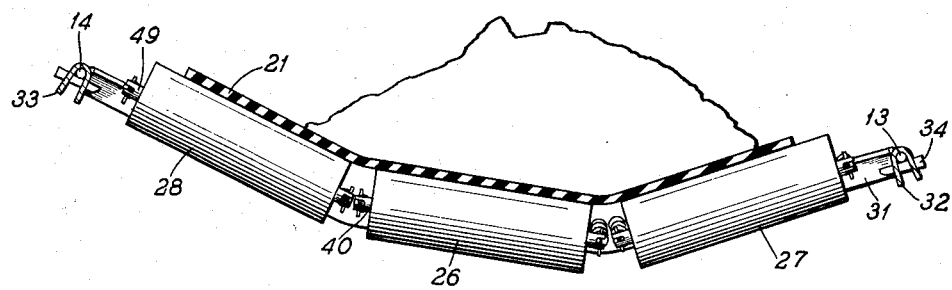
FIGURE 5 illustrates the troughing contour assumed by the rollers when an off-center load passes thereover.

In FIGURE 5, the troughing idler assembly is illustrated in an off-center load condition. In this instance the belt has shifted to the right and the rollers 26, 27 and 28 have assumed a troughing contour in which the lowest point is formed at the junction of center roller 26 and right wing roller 27. Since there is no connection between the abutting shaft ends, no troughing effect is transmitted from one roller to the other, or from either to left wing roller 28.

Figure 7:
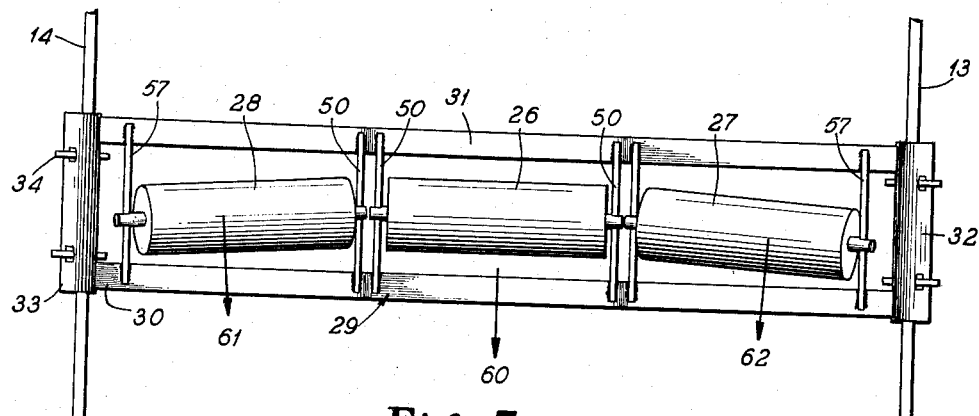
FIGURE 7 is a diagrammatic view illustrating the individual rollers positioned to impart a training effect to the belt.

In FIGURE 7, wing rollers 27 and 28 are so positioned as to impart a training effect to the belt. The outer ends of the wing roller shafts have been secured to the roller shaft supporting members, in this instance strand links 57, downstream from the mid-point of the strand to thereby cant the roller in the direction 60 of belt travel. As a result, the training effect exerted by the rollers on the belt is exerted in the direction of the force vectors 61 and 62.

The use and operation of the invention is as follows:

The present invention provides means for supporting the individual rollers in a troughing idler assembly independently of one another so that load received on one roller is not transmitted to another. As a result, each roller will deflect or shift from its normal unloaded position substantially solely in response to the weight of the load carried by the belt. As a consequence, a large, off center point load will not disrupt the troughing contour on the opposite side of the idler assembly and cause spillage of conveyed materials near the teetering point.

In FIGURE 3, the slotted ends of shafts 40, 49 and 49 of rollers 26, 27 and 28 receive short yieldable roller supporting members 43, which in this instance are coil springs. When a load approaches the center roller 26 for example, it deflects to the broken line position of FIGURE 4 substantially independently of the action of the wing rollers. Slippage of the roller along the coil springs is prevented by the upwardly inclined portions 55, 56 of the individual coil turns adjacent the edges of slot 41.

This form of roller supporting member permits horizontal as well as vertical deflection (in other words, universal displacement) due to the compressibility of the coil spring. As a consequence, this embodiment is particularly well adapted to take shock loads.

In FIGURE 6, a variant embodiment is illustrated in which the roller shaft supporting members are short lengths 50 of flexible strand. This embodiment provides flexure in a vertical plane but substantially limits reciprocation of the roller in a generally horizontal direction parallel to belt travel.

Each of the FIGURES 4 and 6 embodiments provides at least a limited movement in a generally horizontal plane parallel to the side frame members.

Each of these embodiments illustrates the rollers as substantially axially aligned so that a vertical plane transverse to the strands would contain the axes of the rollers in an unloaded condition. In some instances, however, it may be advantageous to offset the rollers. Thus, the center roller 26 may be located midway between the side frame members 30, 31 and the wing rollers bodily displaced forwardly or rearwardly from the center roller while maintaining the roller axes parallel. Similarly, the wing rollers could be positioned midway between the side frame members and the center roller displaced forwardly or rearwardly, or both the center and wing rollers offset from their positions shown in FIGURE 3.

In FIGURE 7, the wing rollers have been so oriented that they impart a training effect to the belt as it passes thereover.

It is well known that the training effect imparted to a belt by a roller in a troughing idler assembly acts in a direction substantially perpendicular to the axis of the roller. In general, the training effect is substantially proportional to the amount of contact between belt and roller.

As the belt moves over the assembly of FIGURE 7 in the direction of arrow 60, it is acted upon by the training forces 61 and 62. If the belt runs centered, the training forces offset one another and maintain the belt running true down the center of the assembly. If the belt should be trained to one side for any reason, say for example to the right, as viewed in FIGURE 7, the detraining effect is automatically corrected by the wing rollers. As the contact between the belt and left wing roller 28 decreases, the contact between the belt and right wing roller 27 increases. The left training effect 61 will decrease and right training effect 62 correspondingly increases. This overbalancing of the training forces urges the belt back to a centered position.

Although a preferred embodiment and one variation have been illustrated, it will be understood that the foregoing is illustrative only and not definitive. Accordingly, the invention should not be limited except by the scope of the following appended claims.

I claim:

1. A flexible strand conveyor especially adapted for use in low clearance installations, said flexible strand conveyor including, in combination, a pair of generally parallel flexible strands, such as wire ropes, trained along a conveying course, supporting structures located at intervals along the conveying course to which the wire ropes are secured and which maintain the wire ropes generally parallel, a plurality of troughing idler assemblies suspended from the wire ropes for supporting the conveying reach of a flexible conveyor belt, return roller means for supporting a return reach of a flexible conveyor belt, and a flexible conveying belt having its conveying reach supported by the troughing idler assemblies and its return reach by the return roller means, one of said troughing idler assemblies having a frame composed of a pair of substantially rigid side members, each side member being concave in an upward direction to thereby provide a troughed contour, said side frames lying parallel to one another in a direction transverse to the axes of the wire ropes, a pair of connectors, one at each end of the side members, the adjacent, abutting ends of the rigid side members being rigidly secured to the connectors, each connector in turn being secured to an associated wire rope whereby the side members are maintained transverse to the longitudinal axes of the wire ropes, a plurality of rollers arranged in generally end-to-end concave relationship between the side members, each roller including a shaft having a roller shell spaced radially outwardly therefrom, and means for yieldably supporting the rollers which enables them to deflect in directions generally perpendicular to the conveying reach of the belt supported thereabove, and transversely to the conveying course to thereby absorb shock loads having substantial transversely directed components which move the rollers in directions generally parallel to their shafts, said means including a pair of yieldable members connected to and spanning the rigid side members, the ends of a roller shaft being connected to associated ones of the pair of yieldable members, said yieldable members being yieldable in directions generally perpendicular to the plane of a conveyor belt passing thereover, and generally parallel to the roller shafts whereby vertical and transversely directed shock loads may be absorbed.

2. A flexible strand conveyor especially adapted for use in low clearance installations, said flexible strand conveyor including, in combination, a pair of generally parallel flexible strands, such as wire ropes, trained along a conveying course, supporting structures located at intervals along the conveying course to which the wire ropes are secured and which maintain the wire ropes generally parallel, a plurality of troughing idler assemblies suspending from the wire ropes for supporting the conveying reach of a flexible conveyor belt, return roller means for supporting a return reach of a flexible conveyor belt, and a flexible conveying belt having its conveying reach supported by the troughing idler assemblies and its return reach by the return roller means, one of said troughing idler assemblies having a frame composed of a pair of substantially rigid side members, each side member being concave in an upward direction to thereby provide a troughed contour, said side frames lying parallel to one another in a direction transverse to the axes of the wire ropes, a pair of connectors, one at each end of the side members, the adjacent, abutting ends of the rigid side members being rigidly secured to the connectors, each connector in turn being secured to an associated wire rope whereby the side members are maintained transverse to the longitudinal axes of the wire ropes, a plurality of rollers arranged in generally end-to-end concave relationship between the side members, each roller including a shaft having a roller shell spaced radially outwardly therefrom, and means for yieldably supporting the rollers which enables them to deflect in directions generally perpendicular to the conveying reach of the belt supported thereabove, and transversely to the conveying course to thereby absorb shock loads having substantial transversely directed components which move the rollers in directions generally parallel to their shafts, said means including a pair of yieldable members connected to and spanning the rigid side members, the ends of a roller shaft being connected to associated ones of the pair of yieldable members, the outer ends of the outermost roller shafts being connected to the yieldable members at positions further downstream than the inner ends of said outermost roller shafts to thereby cant the outermost rollers in a belt training direction, said yieldable members being lengths of wire rope which are yieldable only in directions generally perpendicular to the plane of a conveyor belt passing thereover, and generally parallel to the roller shafts.

References Cited in the file of this patent

UNITED STATES PATENTS

| | | |
|---|---|---|
| 1,743,223 | Lowy | Jan. 14, 1930 |
| 2,851,151 | McCallum | Sept. 9, 1958 |
| 2,889,918 | Bergmann | June 9, 1959 |
| 2,904,166 | Stinson | Sept. 15, 1959 |